(12) United States Patent  
Henning

(10) Patent No.: US 9,333,926 B1  
(45) Date of Patent: May 10, 2016

(54) BUNGEE STORAGE DEVICES AND RELATED METHODS OF USE

(71) Applicant: Fredrick L. Henning, Newport Beach, CA (US)

(72) Inventor: Fredrick L. Henning, Newport Beach, CA (US)

( * ) Notice: Subject to any disclaimer, the term of this patent is extended or adjusted under 35 U.S.C. 154(b) by 0 days.

(21) Appl. No.: 14/695,650

(22) Filed: Apr. 24, 2015

Related U.S. Application Data

(60) Provisional application No. 62/139,389, filed on Mar. 27, 2015.

(51) Int. Cl.
 *B60R 11/06* (2006.01)
 *B60P 7/08* (2006.01)

(52) U.S. Cl.
 CPC ............... *B60R 11/06* (2013.01); *B60P 7/0869* (2013.01)

(58) Field of Classification Search
 CPC .............. A47B 1/00; A47F 7/00; A47F 7/02; A47F 5/05; A47F 5/08; A47F 5/02; B60R 11/06; B60P 7/0869
 USPC .......................... 211/13.1, 14, 113, 60.1, 85.7
 See application file for complete search history.

(56) References Cited

U.S. PATENT DOCUMENTS

| | | | | |
|---|---|---|---|---|
| 929,897 | A * | 8/1909 | Taylor | 211/70 |
| 978,670 | A * | 12/1910 | Solomon | 211/163 |
| 2,883,063 | A * | 4/1959 | Baren | 211/78 |
| 4,334,623 | A * | 6/1982 | Geary | 211/85.29 |
| 4,561,547 | A * | 12/1985 | Estwanik, III | 211/14 |
| 5,020,759 | A | 6/1991 | Weber | |
| 5,845,787 | A | 12/1998 | Dunnavant, Jr. | |
| 6,099,060 | A | 8/2000 | Towers | |
| 6,308,838 | B1 * | 10/2001 | Endean | 211/37 |
| 6,318,571 | B1 * | 11/2001 | Maumus | F27D 5/00 211/194 |
| 7,383,959 | B1 * | 6/2008 | Rudd | 211/13.1 |
| 7,387,211 | B2 | 6/2008 | Anspach | |
| 8,186,524 | B2 * | 5/2012 | Siahpush | 211/196 |
| 2002/0170868 | A1 * | 11/2002 | Morgan | 211/77 |
| 2003/0192840 | A1 * | 10/2003 | Hoyle et al. | 211/85.2 |
| 2007/0284326 | A1 | 12/2007 | Baloun | |
| 2012/0085771 | A1 | 4/2012 | O'Flaherty et al. | |

* cited by examiner

*Primary Examiner* — Korie H Chan

(74) *Attorney, Agent, or Firm* — Eric Karich; Karich & Associates

(57) ABSTRACT

A storage device for storing bungee cords has a plurality of mounting plates, each provided with a plurality of mounting apertures therethrough. The storage device also includes a plurality of elongate frame elements that engage the mounting plates to operably space the mounting plates so that the mounting plates are spaced a distance suitable for mounting the bungee cords on the storage device.

1 Claim, 7 Drawing Sheets

BUNGEE STORAGE DEVICES AND RELATED METHODS OF USE

CROSS-REFERENCE TO RELATED APPLICATIONS

This application for a utility patent claims the benefit of U.S. Provisional Application No. 62/139,389, filed Mar. 27, 2015.

BACKGROUND OF INVENTION

1. Field of Invention

The invention relates generally to carriers, supporters, holders or storage apparatuses for elastic cords, and more particularly to bungee storage devices and related methods of use.

2. Description of Related Art

Bungee cords (also referred to as bungees or shock cords) are well known devices that provide a convenient tool for absorbing shock, or tying down or maintaining the positioning of an article in a given location. For instance, articles being transported in a truck bed can be subjected to a variety of forces, such as wind and road conditions. Such articles are tightly secured to the truck using bungee cords to prevent unwanted movement, damage, or loss of the articles.

A typical bungee cord includes a resilient cord, which is typically made of a cylindrical or rectangular-shaped elastic material, with fasteners made of metal or plastic attached to each end of the resilient cord. The bungee cord may have different configurations based on the shape of each fastener. For example, a bungee cord may have a fastener shaped as a frustoconical spiral spring at one end and a hook at the other end. Alternatively, the fastener may be formed in the shape of an "S" with oppositely facing hooks at the ends of the fastener. The hook may be U shaped or J shaped so that the bungee cord can be releasably engaged to a strut, post, or other object. Since the hooks can further engage with each other or along a portion of the resilient cord, bungee cords may become entangled if loosely carried or stored in a pile, or the like, to require a significant investment of time to disentangle the stored bungees before they can be used. Various storage devices are traditionally available to organize or carry bungee cords.

Rudd, U.S. Pat. No. 7,383,959, teaches a bungee carousel that provides a support and storage apparatus for elastic fastening devices, such as bungee cords. The cylindrical carousel configuration includes slots and apertures for holding various bungee cords, and may accommodate different lengths of the bungee cords. The bungee carousel may be hung from an axle in the horizontal position or mounted in a stand in a vertical or horizontal position to accommodate a variety of storage locations. While the Rudd device is elongate in construction and may accommodate bungee cords, it is of entirely different construction, and is not modular in nature, and cannot be disassembled for easier shipping and storage.

Towers, U.S. Pat. No. 6,099,060, teaches a generally rectangular frame-like carrier for a plurality of various sized, stretchable, elastic bungee cords. The carrier has at least three spaced apart cross arms for supporting bungee cords in an organized and compact manner between any two of the cross arms. The cross arms are appropriately spaced such that commercially available sizes of bungee cords are supported on the carrier in a slightly stretched condition. Thus, the cords are supported under enough tension on the carrier to resist disengagement and maintain proper positioning, yet a small enough amount of tension is required to prevent an accidently disengaged cord from creating a hazard as it snaps back into a non-tensioned condition.

Anspach, U.S. Pat. No. 7,387,211, teaches another generally rectangular carrier for bungee cords, which folds and nests such that bungee cords mounted on one portion of the carrier interfit with bungee cords on another portion of the carrier to facilitate the compact storage and transport of the bungee cords. However, the carrier has a limited storage capacity in a folded configuration and a larger footprint in an unfolded configuration.

O'Flaherty et. al., U.S. 2012/0085771, teaches a device for storing bungee cords. The device includes a tube having notches cut into each end along with slots cut into its length. The notches and slots provide connection points for bungee cords to the tube. However, the tube does not have a flexible design that can be manipulated by a user to dynamically increase its storage capacity.

Baloun, U. S. 2007/0284326, teaches an elastic strap storage apparatus including a first set of cross members, and a second set of cross members attached to the first set of cross members. The first set of cross members and the second set of cross members have stops on each end of the cross member. However, the apparatus does not provide simplicity and ease to access or remove short-length elastic straps such as bungee cords attached to it while multiple long-length elastic straps are attached to the first set of cross members and the second set of cross members.

Dunnavant, Jr., U.S. Pat. No. 5,845,787, teaches a rack for storage of elongated resilient members, such as bungee cords, which have fasteners connected to opposite end regions of the elongated resilient members. The rack has a pair of opposed sides with first and second support members connected to an upper portion of each of the sides and a third support member connected to a lower portion of the sides. The first and second support members are disposed a predetermined distance apart. The first and second support members each have a predetermined width which is sufficient to be releasably engaged by the fasteners of the elongated resilient members. An elongated resilient member can be stored on the rack by engaging one of the fasteners on the first support member, pulling the resilient member around the third support member, and engaging the other fastener to the second support member. Since the rack requires a greater number of support members arranged apart from each other by a certain distance to store the elongated resilient members, the overall rack weight is increased that hampers maneuverability without improving storage capacity of the rack.

Weber, U.S. Pat. No. 5,020,759, teaches a holder for extension cords or the like including a vertically disposed support having a multiple support teeth extending substantially horizontally outwardly therefrom. The cord is supported on the support members in a looped fashion and a gate is then lowered with respect thereto to maintain the loops of the cord on the support members. The cord may be removed by pulling the same from the support members with the gate acting as a latching device which moves slightly upwardly as each loop is pulled from the holder while maintaining the remaining loops of the cord thereon. However at each support member, multiple extension cords being stored in unstretched or non-tensioned condition may cross over each other to get entangled. Moreover as the gate locks or unlocks each of the support members simultaneously, access to an extension cord stored on one support member risks falling-off of other extension cords stored on the remaining support members.

The present invention fulfills the needs and drawbacks of the above references, and provides further advantages as described in the following summary.

SUMMARY OF INVENTION

The present invention teaches certain benefits in construction and use which give rise to the objectives described below.

The present invention provides a storage device for storing bungee cords. The storage device includes a plurality of mounting plates each provided with a plurality of mounting apertures therethrough. The storage device also includes a plurality of elongate frame elements that engage the mounting plates to operably space the mounting plates so that the mounting plates are spaced a distance suitable for mounting the bungee cords on the storage device.

One object of this invention is to provide a compact storage device for elastic cords such as bungee cords.

Another object of this invention is to provide a storage device for bungee cords that is modular in nature and can be disassembled for easier shipping and storage.

Another object of this invention is to provide a storage device for bungee cords that provides ease of attachment and removal of the bungee cords.

Another object of this invention is to provide a storage device for bungee cords that is economical to manufacture.

A further object of this invention is to provide a storage device for bungee cords that has a flexible design, which can be manipulated by a user to dynamically increase the storage capacity of the storage device.

Other and further aspects and features of the disclosure will be evident from reading the following detailed description of the embodiments, which are intended to illustrate, not limit, the present disclosure.

BRIEF DESCRIPTION OF DRAWINGS

To further aid in understanding the disclosure, the attached drawings help illustrate specific features of the disclosure and the following is a brief description of the attached drawings.

DETAILED DESCRIPTION OF THE INVENTION

Figure 1:
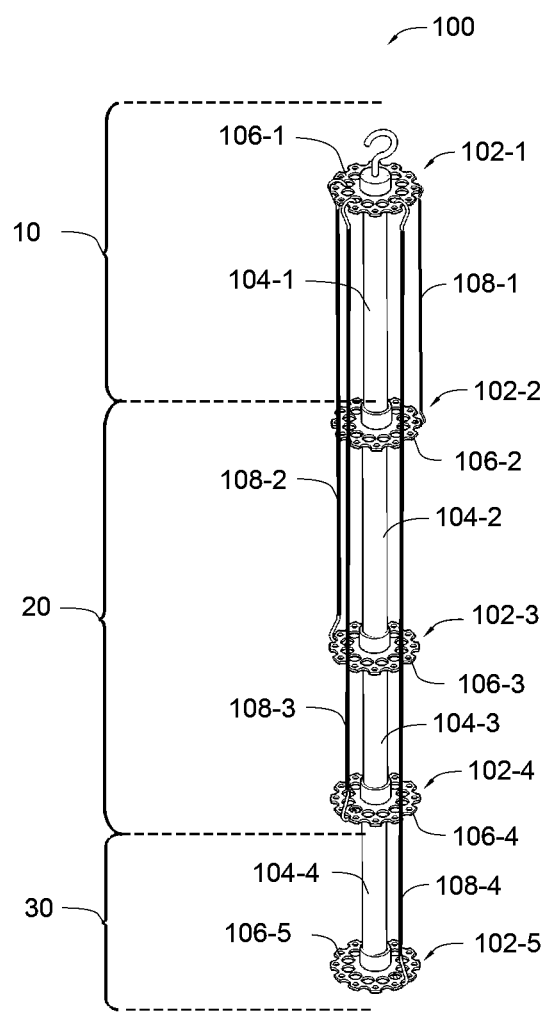
FIG. 1 is a perspective view of a bungee storage device according to one embodiment of the present invention.

FIG. 1 illustrates a perspective view of a bungee storage device 100, according to one embodiment of the present invention. The bungee storage device 100 of this embodiment includes mounting plate assemblies 102-1, 102-2, 102-5 (collectively, mounting plate assemblies 102) and frame elements 104-1, 104-2, 104-3, 104-4 (collectively, frame elements 104).

In one embodiment, the mounting plate assembly 102-1 and the frame element 104-1 may collectively form a top section 10 of the bungee storage device 100; the mounting plate assemblies 102-2, 102-3, 102-4 and the frame elements 104-2, 104-3 may collectively form a middle section 20 of the bungee storage device 100; and the mounting plate assembly 104-5 and the frame element 104-4 may collectively form a bottom section 30 of the bungee storage device 100.

Each of the mounting plate assemblies 102 may include a mounting plate. For example, the mounting plate assembly 102-1 may include a mounting plate 106-1; the mounting plate assembly 102-2 may include a mounting plate 106-2; the mounting plate assembly 102-3 may include a mounting plate 106-3; the mounting plate assembly 102-4 may include a mounting plate 106-4; and the mounting plate assembly 102-5 may include a mounting plate 106-5.

In one embodiment, each of the mounting plates 106-1, 106-2, ..., 106-5 (collectively, mounting plates 106) may be disk-shaped, with a substantially circular perimeter. For purposes of this application, the term "substantially" means including shapes that are not precisely of a stated geometry, but which are generally considered equivalent by one skilled in the art (e.g., oval, polygonal, etc.). While the plates 106 may be disk-shaped, other suitable shapes may also be employed in alternative embodiments. The mounting plates 106 may have appropriate thickness so that they are able to withstand the pressure that may be applied by elastic cords such as bungee cords 108-1, 108-2, 108-3, 108-4 (collectively, bungee cords 108) mounted in slightly stretched or tensioned condition on the bungee storage device 100, wherein the bungee cords 108 are under a slight tension so that they remain properly mounted and do not fall off, but are not stretched so much that the material of the bungee cord is damaged due to the stretching, despite significant periods of time in storage.

Each successive pair in the mounting plate assemblies 102 may be attached to a frame element therebetween. For example, the mounting plate assemblies 102-1 and 102-2 may be mounted on opposing ends of the frame element 104-1. Each of the frame elements 104 are an elongate tube being detachably connected, permanently coupled, or formed integral with a mounting plate assembly such as the mounting plate assembly 102-1 using a variety of mechanisms known in the art. Examples of these mechanisms include, but are not limited to, a snap fit, a screw fit, friction fit, and gluing, which may be chosen depending on the material from which the frame elements 104 are made, and other considerations known to those skilled in the art.

In this embodiment, the frame elements 104 may have a tubular construction. The tubular construction may have a circular cross-section, or other shape (e.g., rectangular, elliptical, oval, polygon, irregular, etc.). The frame elements 104 may also have non-tubular constructions (e.g., rod, etc.), and may be made of a variety of rigid or semi-rigid materials, including plastics, metals, alloys, polymers, composites, or any other suitable material known to those skilled in the art. The frame elements 104 may maintain a predetermined distance between the mounting plates 106 for operably mounting the bungee cords 108 on the bungee storage device 100, so that the mounted bungee cords 108 are maintained under a predetermined tension, which compresses the mounting plates against the frame elements 104.

The bungee cords 108 are typically made with different predetermined lengths. For example, the bungee cord 108-1 may have a predetermined length ranging from 9" to 11"; the bungee cord 108-2 may have a predetermined length ranging from 18" to 20"; the bungee cord 108-3 may have a predetermined length ranging from 24" to 28"; and the bungee cord 108-4 may have a predetermined length ranging from 32" to 36".

The bungee cords 108 may be mounted onto any pair of mounting plates among the mounting plates 106 based on respective lengths of the bungee cords 108. For example, the bungee cord 108-1 may be mounted onto the mounting plates 106-1 and 106-2; the bungee cord 108-2 may be mounted onto the mounting plates 106-1 and 106-3; the bungee cord 108-3 may be mounted onto the mounting plates 106-1 and 106-4; and the bungee cord 108-4 may be mounted onto the mounting plates 106-1 and 106-5. Each of the bungee cords 108 may be mounted in a stretched or tensioned condition and aligned substantially parallel to the longitudinal axis of the bungee storage device 100.

Figure 2:
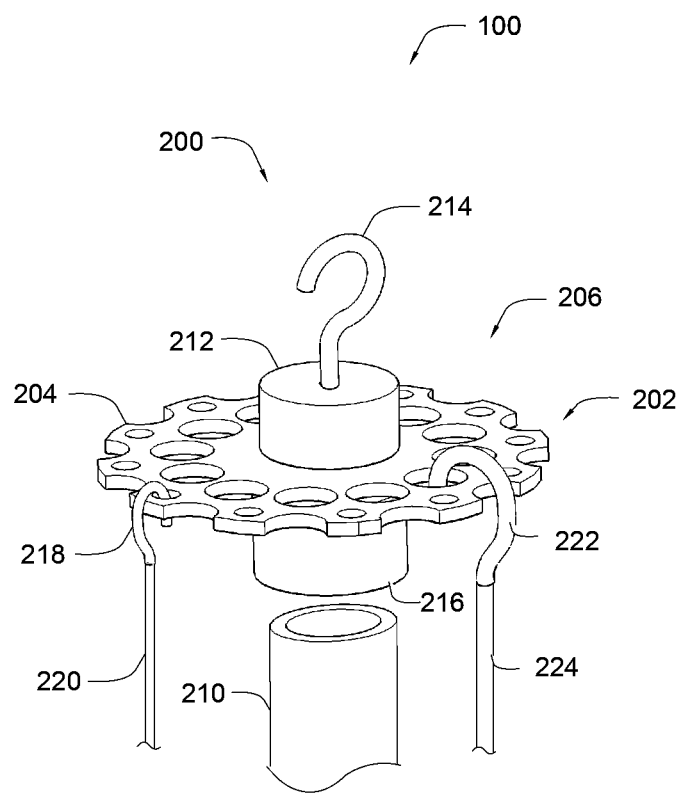
FIG. 2 is an exploded perspective view of a top portion of the bungee storage device, illustrating a first of a plurality of mounting plates mounted on a first of a plurality of elongate frame elements.

FIG. 2 is an exploded perspective view of a top section 200 of the bungee storage device 100 of FIG. 1, according to an embodiment of the present disclosure. The top section 200 includes a mounting plate assembly 202 having a mounting plate 204, which has a top side 206 and a bottom side 208. The top side 206 may be defined as a side distal to a frame element 210 engaged with the mounting plate 206. The bottom side 208 may be defined as a side proximal to the frame element 210 engaged with the mounting plate 204.

At the top side 206, the mounting plate 202 may be detachably connected, permanently coupled, or formed integral with a handle cap 212 using a variety of fasteners known in the art. Examples of these fasteners include, but not limited to, a set screw, a nut and bolt arrangement, a rivet, a plug with a tapered section capable of engaging with the mounting plate 204, glue, etc. The handle cap 212 may be a cylindrical block having an organizer hanger 214 attached to an upper surface opposing to a lower surface, which is substantially flat and communicates with the mounting plate 204. The organizer hanger 214 facilitates to hang or hold the bungee storage device 100. The organizer hanger 214 may have any suitable shape such as a hook and size that supports portability and maneuverability of the bungee storage device 100. The handle cap 212 and the organizer hanger 214 may be made of same or different rigid, or semi-rigid, and heat resistant materials including, but not limited to, metals, alloys, polymers, composites, wood, etc.

At the bottom side 208, the mounting plate 204 may be coupled to the frame element 210 using a suitable connector or receiver. For example, the mounting plate 204 may be coupled to the frame element 210 using a tubular sleeve 216 adapted to rigidly receive and secure the frame element 210. The frame element 210 may have a central axis (not shown) that longitudinally passes through the center of the frame element 210. In one embodiment, the central axis may also pass through the center of the sleeve 216 and the handle cap 212 arranged on the mounting plate 106-1.

The mounting plate 204 may be adapted to receive fasteners such as hooks having predetermined dimensions attached to bungee cords. For example, the mounting plate 204 may receive a hook 218 attached to a bungee cord 220 having lengths ranging from 9" to 11" and a hook 222 attached to another bungee cord 224 having lengths ranging from 18" to 36".

Figure 3:
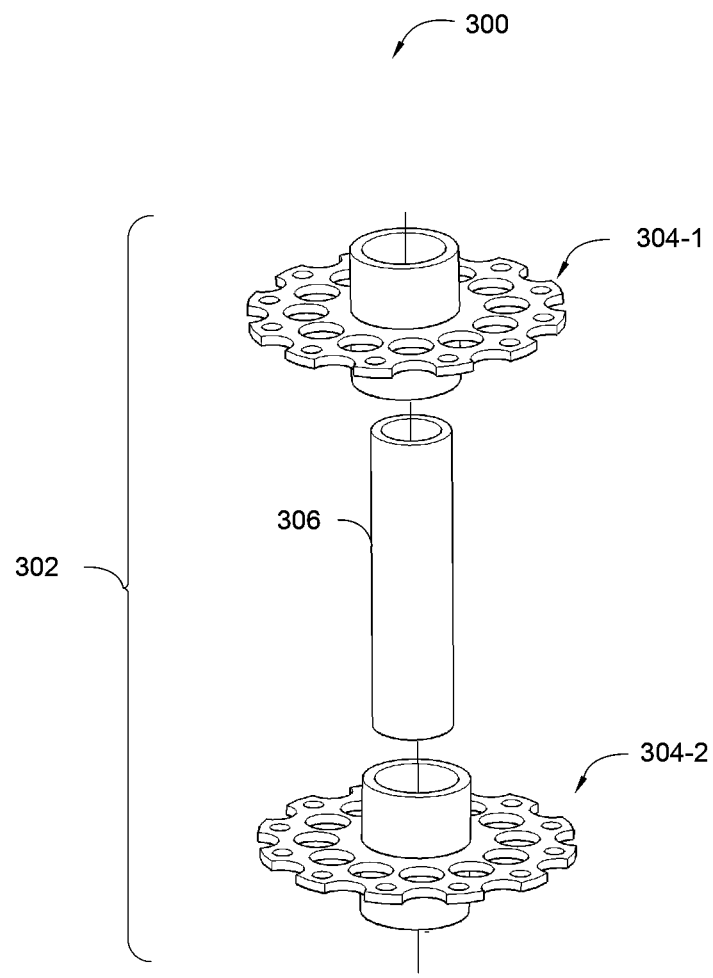
FIG. 3 is an exploded perspective view of a middle portion of the bungee storage device, illustrating second and third mounting plates mounted on a second of the plurality of elongate frame elements.

FIG. 3 is an exploded perspective view that illustrates a middle section portion 300 of the bungee storage device 100 of FIG. 1, according to an embodiment of the present disclosure. The middle section 300 may include one or more mounting cores 302, each mounting core 302 including a pair of mounting plate assemblies and a frame element therebetween. In the illustrated example, the mounting core 302 includes the mounting plate assemblies 304-1 and 304-2 capable of being connected to opposing ends of the frame element 306. The length of the frame element 306 may be varied to change the length of the bungee storage device 100 based on the lengths of the bungee cords such as the bungee cords 108 to be connected to the bungee storage device 100. In one embodiment, multiple mounting cores 302 such as the mounting core 302 may be longitudinally connected through a frame element and a mounting plate assembly using a receiver such as the sleeve 210 attached to the mounting plate assembly. For example, a mounting plate assembly 304-1 of the mounting core 302 may be connected to another mounting plate assembly (not shown) through a frame element (not shown) being rigidly engaged with respective sleeves of both the mounting assemblies such that the sleeves face each other.

Figure 4:
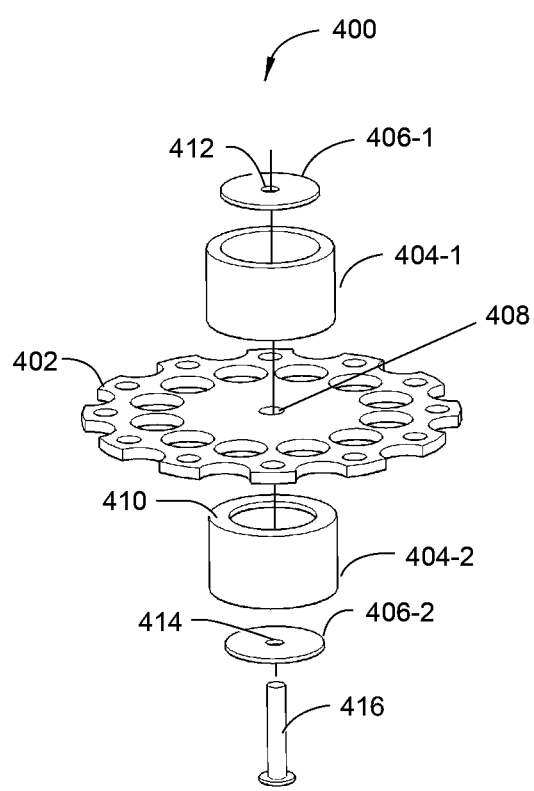
FIG. 4 is an exploded perspective view of one embodiment of a subassembly used for mounting one of the mounting plates on one of the elongate frame elements.

FIG. 4 is an exploded view of an exemplary mounting plate assembly for a middle section of the bungee storage device of FIG. 1, according to an embodiment of the present disclosure. A mounting plate assembly 400 includes a mounting plate 402, tubular sleeves 404-1, 404-2 (collectively, sleeves 404), and washers 406-1, 406-2 (collectively, washers 406).

The mounting plate 402 may be in the form of a disc being substantially circular having a predetermined diameter; however other suitable shapes may be employed. The mounting plate 402 may have a first hole 408 at the center.

Each of the tubular sleeves 404 may have a first open end and a second open end opposing to the first open end. In one embodiment, each of the sleeves 404 such as the sleeve 404-2 may include a flat surface 410 along its perimeter. The flat surface 410 may partially extend towards the center of the sleeve 404-2 and in a plane that is substantially parallel to the longitudinal axis of the sleeve 404-2. The flat surface 410 may be adapted to receive a washer such as the washer 406-2.

The washers 406 may have suitable dimensions for being inserted within the respective sleeves 404 from the second open end and substantially rest on the flat surface such as the flat surface 410. In one example, each of the washers 406 may be substantially circular having a diameter slightly lesser than that of the respective sleeves 404 in which the washers 406 are inserted. For instance, the washer 406-1 may be inserted with the sleeve 404-1 to create a first sleeve-washer set, and the washer 406-2 may be inserted within the sleeve 404-2 to create a second sleeve-washer set. Further, the washers 406 may include a second hole 412 and a third hole 414 respectively for receiving one or more fasteners. The second hole 412 may be located at the center of the washer 406-1 and the third hole 414 may be located at the center of the washer 406-2.

In one embodiment, the first sleeve-washer set and the second sleeve-washer set may be arranged on opposing surfaces of the mounting plate 402 such that the first hole 408 coincides with the second hole 412 and the third hole 414. One of a variety of fasteners known in the art, in this case a rivet 416, may be inserted through the first hole 408, the second hole 412, and the third hole 414 for securing the sleeves 404 to the mounting plate 402.

Figure 5:
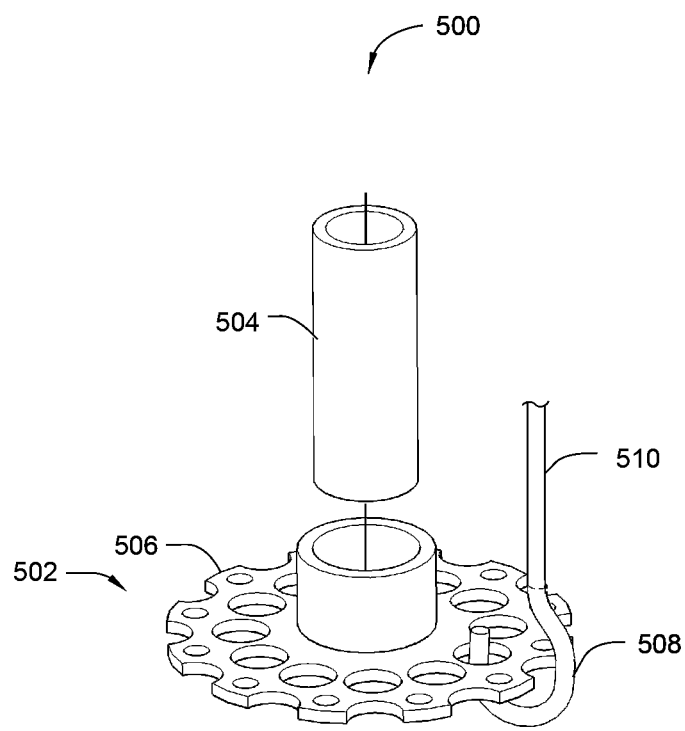
FIG. 5 is an exploded perspective view of a fifth of the mounting plates.

FIG. 5 is an exploded perspective view that illustrates a third section 500 for the bungee storage device 100 of FIG. 1, according to an embodiment of the present disclosure. The third section 500 may include a mounting plate assembly 502 and a frame element 504. One end of the mounting plate assembly 502 may include a mounting plate 506 attached to a tubular sleeve 508 for receiving the frame element 504. The diameter of the sleeve 508 may be relatively greater than that of the frame element 504.

The frame element 504 may frictionally engage with the sleeve 508 to rigidly secure within the sleeve 508. Alternatively, the inner curved surface of the sleeve 508 and at least one end of the frame element 504 may be threaded for screwing the frame element 504 within the sleeve 508. One ordinarily skilled in the art may implement other suitable techniques known in the art, related art, or developed later to rigidly secure the frame element 504 within the sleeve 508.

The mounting plate 506 may be adapted to receive fasteners such as hooks having predetermined dimensions attached to bungee cords. For example, the mounting plate 506 may receive a hook 508 attached to a bungee cord 510 having lengths ranging from 18" to 36".

Figure 6:
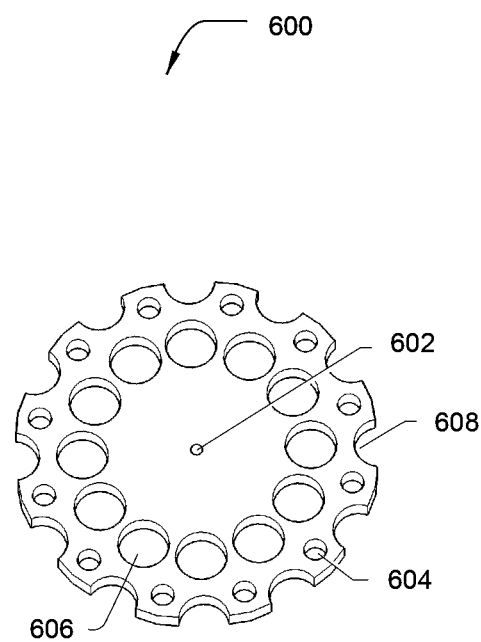
FIG. 6 is a top perspective view of one of the mounting plates that is included in the bungee storage device of FIG. 1, illustrating one embodiment of mounting apertures that may be included through the mounting plate.

FIG. 6 is a perspective view that illustrates an offset view of an exemplary mounting plate 600 implemented by the mounting plate assembly of FIG. 4, according to an embodiment of the present disclosure. The mounting plate 600 may include a hole 602 at the center (hereinafter referred to as central hole 602) for being connected to at least one sleeve such as the sleeve 404-1 via a washer 406-1, as discussed above. The mounting plate 600 may be in the form of a disc being substantially circular; however other suitable shapes such as elliptical, polygon, irregular, etc. may be implemented. The mounting plate 600 may include a first set of mounting apertures such as an aperture 604 and second set of mounting apertures, such as an aperture 606, which are relatively larger than the first set of mounting apertures.

The first set of mounting apertures may extend through a protrusion extending outwardly from the mounting plate 600. The first set of mounting apertures may be located proximate to the perimeter of the mounting plate 600. The first set of mounting apertures may be adapted to receive fasteners such as hooks of bungee cords, such as the bungee cord 108-1, which may have lengths ranging from 9" to 11".

The second set of mounting apertures may be spaced inwardly by a predetermined distance from the perimeter of the mounting plate 600. In one embodiment, the second set of mounting apertures may be located between the central hole 602 and the first set of mounting apertures. The second set of mounting apertures may be adapted to receive fasteners such as hooks of bungee cords, which may have lengths, e.g., ranging from 18" to 36".

The perimeter of the mounting plate 600 may include one or more concave portions such as a concave portion 608 adjacent to the second set of mounting apertures. The concave portions may be aligned to the second set of mounting apertures for receiving bungee cords whose fasteners such as hooks may be connected to the second set of mounting apertures.

Further, the bungee cords having longer lengths such as 18" to 36" are relatively thicker than short bungee cords such as those having lengths ranging from 9" to 11" and therefore, the long bungee cords have greater tendency to move sideways along the perimeter of the mounting plate 600 while being connected in a tensioned condition to the second set of mounting apertures. Hence, the concave portions immovably secure the bungee cords connected to the second set of mounting apertures and prevent them to pass over the adjacently located bungee cords. In one embodiment, the concave portions may be created between a pair of apertures among the first set of mounting apertures. The mounting plate 600 may be made of a rigid or semi-rigid and heat-resistant material including metals, alloys, polymers, composites, wood, or the like.

Figure 7:
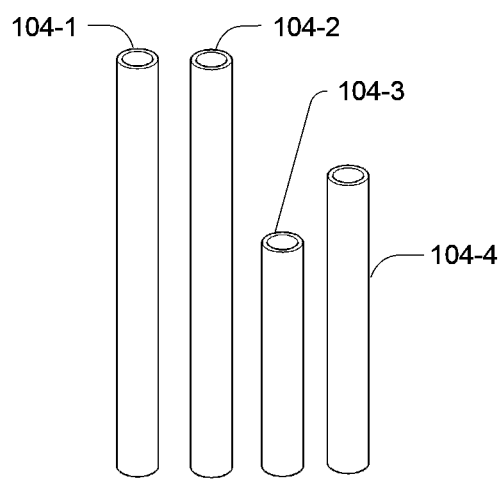
FIG. 7 is a perspective view of the elongate frame elements that are included in the bungee storage device of FIG. 1.

FIG. 7 illustrates exemplary frame elements for being implemented by the bungee storage device of FIG. 1, according to an embodiment of the present disclosure. The frame elements 104-1, 104-2, 104-3, 104-4 are elongated tubes having a circular cross-section; however other suitable cross-sectional shapes such as those discussed above may be implemented.

The frame elements 104 may be of different lengths to longitudinally increase or decrease the size of a bungee storage device such as the bungee storage device 100 based on the lengths of bungee cords such as bungee cords 108 intended to be connected to the bungee storage device 100. In one example, the frame elements 104-1, 104-2 may be of relatively same length. However, the frame element 104-4 may be shorter than the frame elements 104-1, 104-2 but longer than the frame element 104-3.

Further, in an embodiment, the bungee storage device 100 may be provided as a kit to a user. The kit may include a variety of articles, which are assembled to form the bungee storage device 100. These articles may include, but not limited to, the mounting plates, sleeves, washers, frame elements, rivets, and a handle cap 212, each as discussed above. Alternatively or additionally, the kit may include one or more bungee cords of different lengths. One ordinarily skilled in the art would understand to include frame elements having appropriate specifications for maintaining appropriate distance between the mounting plates so that the bungee cords mounted on the bungee storage device 100 are maintained under a predetermined tension, which compresses the mounting plates against the elongate frame elements.

During operation, elastic cords such as the bungee cords 108 may be stored and retrieved using the bungee storage device 100 by rotating the bungee storage device such that a pair of apertures on different mounting plates is in view so that a bungee cord of interest may be stretched and fasteners such as hooks on opposing ends of the bungee cord are mounted onto separate mounting plates. This is repeated for each bungee cord desired to be stored on the bungee storage device 100. The stored bungee cords such as the bungee cords 108 are then in a compact and visible storage configuration on the bungee storage device 100.

Retrieval of a desired bungee cord is by rotating the bungee storage device to inspect the lengths of the bungee cords, and selecting a desired bungee cord length. The desired bungee cord is stretched to disengage the fasteners such as the hooks attached to the bungee cord from the bungee storage device 100, particularly the mounting plates such as the mounting plates 106 one-by-one.

The term "bungee cord," which is also referred to as a shock cord, includes any form of engineered stretchable cord or similar device typically referred to as "bungee cords" by those skilled in the art, and also further includes alternative similar cords or similar items that one might desire to store in a similar manner.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

Although the embodiments described above have been set out in connection with the bungee storage device 100, those ordinarily skilled in the art will understand that the principles set out above can be applied to any bungee storage device 100 and can be implemented in different ways without departing from the scope of the invention as defined by the claims. In particular, constructional details, including manufacturing techniques and materials, are well within the understanding of those ordinarily skilled in the art and have not been set out in any detail here. These and other modifications and variations are well within the scope of the present disclosure and can be envisioned and implemented by those of skill in the art.

Moreover, while specific embodiments may have been illustrated and described collectively herein, it should be appreciated that any subsequent arrangement designed to achieve the same or similar purpose may be substituted for the specific embodiments described and shown herein. This disclosure is intended to cover any and all subsequent adaptations or variations of various embodiments. Combinations of the above embodiments, and other embodiments not specifically described herein, will be apparent to those of skill in the art upon reviewing the description.

Other embodiments of the present disclosure will be apparent to those skilled in the art from consideration of the specification and practice of the embodiments disclosed herein. It is intended that the specification and examples be considered as exemplary only, and departure in form and detail may be made without departing from the scope and spirit of the present disclosure as defined by the following claims.

What is claimed is:

1. A method for storing bungee cords, the method comprising the steps of:
   providing a plurality of mounting plates, each of the mounting plates comprising:
      a perimeter that includes a plurality of protrusions that extend radially outwardly from the mounting plate, wherein the plurality of protrusions are separated from one another at least in part by at least one of a plurality of concave portions that extend inwardly into the perimeter of the mounting plate;
      a first set of apertures, each of the first set of apertures extending through one of the protrusions;
      a second set of apertures through the mounting plate which are each positioned radially between two apertures of the first set of apertures; and
      wherein the mounting plates are identical to each other in perimeter diameter, in the shape of the protrusions and the concave portions, and in the positioning of the first and second apertures;
   providing at least one elongate frame element having a rigid, tubular construction;
   engaging the plurality of mounting plates with the at least one elongate frame element to operably space the mounting plates a distance suitable for mounting the bungee cords;
   providing a plurality of bungee cords, each of the bungee cords having a hook-shaped fastener attached to each end of the bungee cord; and
   mounting the bungee cords on the storage device using the following steps for at least some of the bungee cords:
      attaching one of the hook-shaped fasteners of the bungee cord to one of the mounting plates by inserting the hook-shaped fastener through one of the first set of apertures of the mounting plate; and
      attaching the other of the hook-shaped fasteners of the bungee cord to another of the mounting plates by inserting the hook-shaped fastener through one of the first set of apertures of the mounting plate, such that the bungee cord is held in an orientation that is parallel to the longitudinal axis of the plurality of elongate frame elements.

* * * * *